United States Patent [19]

Tanaka et al.

[11] Patent Number: 4,920,759

[45] Date of Patent: May 1, 1990

[54] RADIANT HEAT CONTROL APPARATUS FOR AUTOMOTIVE VEHICLE

[75] Inventors: Masakazu Tanaka, Isehara; Toshio Ohashi, Atsugi, both of Japan

[73] Assignee: Nissan Motor Co., Ltd., Yokohama, Japan

[21] Appl. No.: 343,216

[22] Filed: Apr. 26, 1989

[30] Foreign Application Priority Data

Apr. 26, 1988 [JP] Japan .................. 63-101358

[51] Int. Cl.⁵ ............................. B60H 1/32
[52] U.S. Cl. ........................ 62/244; 237/2 A; 165/39; 165/41
[58] Field of Search ............ 237/70, 12.3 A, 12.3 B, 237/12.3 R, 2 A; 165/41, 39; 62/244

[56] References Cited

U.S. PATENT DOCUMENTS 4,658,597 4/1987 Shum ...................... 62/244

FOREIGN PATENT DOCUMENTS 61-61220 4/1986 Japan .

Primary Examiner—Henry A. Bennet
Attorney, Agent, or Firm—Foley & Lardner, Schwartz, Jeffery, Schwaab, Mack, Blumenthal & Evans

[57] ABSTRACT

Even if temperature within a vehicle passenger compartment is kept at a constant value, passengers feel uncomfortable in summer for instance, because radiant heat is transferred from the vehicle body to the passenger. To allow the passengers to feel comfortable, the control apparatus comprises radiant heat sensors disposed within the passenger compartment; temperature adjusting devices disposed in the vehicle body, and controller for reducing the amount of heat transferred between the vehicle body and the passengers.

16 Claims, 5 Drawing Sheets

WINTER

SUMMER

WINTER

RADIANT HEAT CONTROL APPARATUS FOR AUTOMOTIVE VEHICLE

BACKGROUND OF THE INVENTION

1. Field of the Invention

The present invention relates to a radiant heat control apparatus for an automotive vehicle, which can control the amount of radiant heat transferred between vehicle body inner surfaces and passengers within an optimum range.

2. Description of the Prior Art

The effect of the radiant heat control apparatus will be described with reference to FIGS. 1(A) and (B).

In FIGS. 1(A) and (B), a vehicle passenger M takes a seat enclosed by the inner surface S of a vehicle body such as a roof 1, side windshields 2, doors 3, a floor panel 4, etc. Therefore, radiant heat is transferred between the passenger M and the vehicle body inner surface S according to a difference in temperature between the two.

In winter, for instance, since the external temperature is low and therefore the vehicle inner surface S is cold, even if temperature within the passenger compartment is kept at a constant warm temperature by an air conditioner, radiant heat is transferred from the skin of the passenger M to the vehicle body inner surface S (called negative radiation (N), so that the passenger M feels cold because radiant heat is radiated from the passenger M, as shown in FIG. 1(A). On the other hand, in summer, since the external temperature is high and therefore the vehicle body inner surface S is hot, even if temperature within the passenger compartment is kept at a constant cool temperature by an air conditioner, radiant heat is transferred from the vehicle body inner surface S to the passenger M (called positive radiation P), so that the passenger M feels hot because radiant heat is applied to the passenger M, as shown in FIG. 1(B).

To overcome the above-mentioned problem, Japanese Published Unexamined (Kokai) Utility Model Application No. 61-61220 discloses heat generators 5 disposed within the side doors 3 as shown in FIG. 2(A) in order to change the negative radiation N as shown in FIG. 1(A) to the positive radiation P as shown in FIG. 1(B) between the passenger M and the vehicle body inner surface S. In the prior-art radiant heat control apparatus, however, since the heat generators 5 are simply turned on or off to heat only the vehicle door inner surface S, it has been impossible to comfortably control radiant heat transferred between the passenger and the vehicle inner surface.

SUMMARY OF THE INVENTION

With these problems in mind, therefore it is the primary object of the present invention to provide a radiant heat control apparatus for an automotive vehicle which can control the amount of radiant heat transferred between vehicle body inner surface and passengers within an optimum range so as to allow the passengers to be comfortable.

To achieve the above-mentioned object, a radiant heat control apparatus for an automotive vehicle provided with a vehicle body and a passenger compartment according to the present invention comprises:

(a) radiant heat sensing means, disposed within the passenger compartment, for sensing radiant heat transferred between an inner surface of the vehicle body and an inner position within the passenger compartment; (b) temperature adjusting means, disposed in the vehicle body, for adjusting temperature on the inner surface of the vehicle body; (c) control means, coupled to said radiant heat sensing means and said temperature adjusting means, for controlling the amount of radiant heat transferred between the inner surface of the vehicle body and the inner position within the passenger compartment on the basis of signals from said radiant heat sensing means.

The radiant heat sensing means such as bolometer, thermopile, etc. are disposed on head rests, shoulder portions of seat backs, and front sides of seat cushions, etc. Further, it is also possible to use temperature sensors instead of the radiant heat sensing means. The temperature adjusting means such as heating element, cooling element, peltier element, light transmissivity adjusting (photochromic) glass, etc. are disposed in a roof panel, door panels, a floor panel, and side windshields, etc. Further, it is preferable to dispose plural fine temperature adjusting means for allowing each passenger to finely adjust temperature on the inner surface of the vehicle body according to passenger's preference. The control means is used in common for an air conditioner provided for the vehicle.

In the control apparatus of the present invention, since the amount of radiant heat transferred between the vehicle body inner surface and the passenger is detected and further the temperature of the vehicle body inner surface can be controlled on the basis of the detect amount of radiant heat, it is possible to allow the passenger to feel always comfortable irrespective of inside or outside temperature of the passenger compartment.

DETAILED DESCRIPTION OF THE PREFERRED EMBODIMENTS

An embodiment of the control apparatus according to the present invention will be described with reference to the attached drawings.

Figure 1:
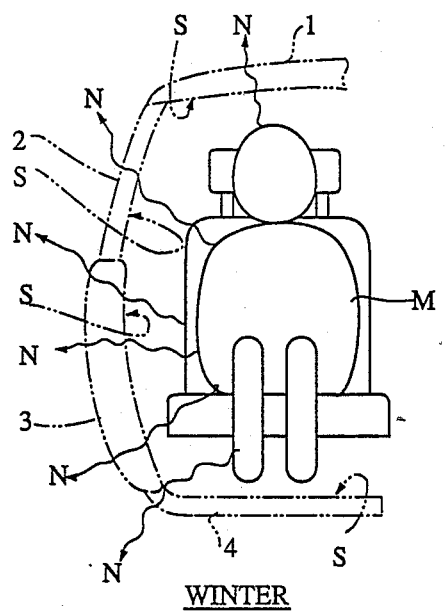
FIG. 1(A) is a half diagrammatical view for assistance in explaining negative radiation transferred from the passengers to the vehicle body inner surface in winter within the passenger compartment.
FIG. 1(B) is a similar half diagrammatical view for assistance in explaining positive radiation transferred from the vehicle body inner surface to the passengers in summer within the passenger compartment.
Figure 1:
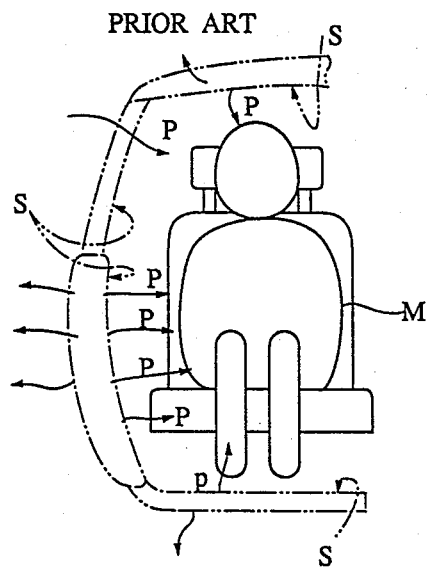
Figure 2:
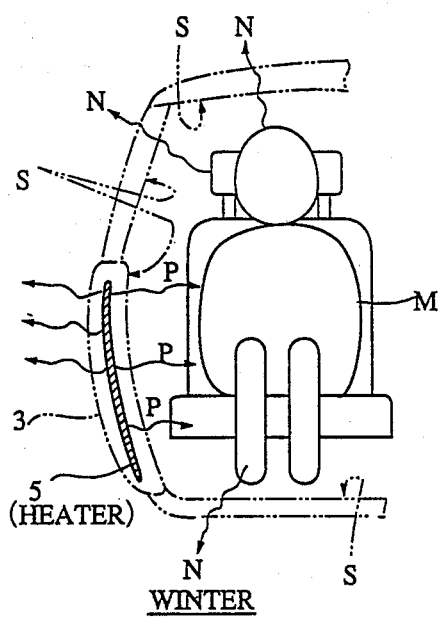
FIG. 2(A) is a similar half diagrammatical view for assistance in explaining the effect of prior-art heat generators disposed within the vehicle side doors.
FIG. 2(B) is a similar half diagrammatical view for assistance in explaining the arrangement of an embodiment of the radiant heat control apparatus for an automotive vehicle according to the present invention.
Figure 2:
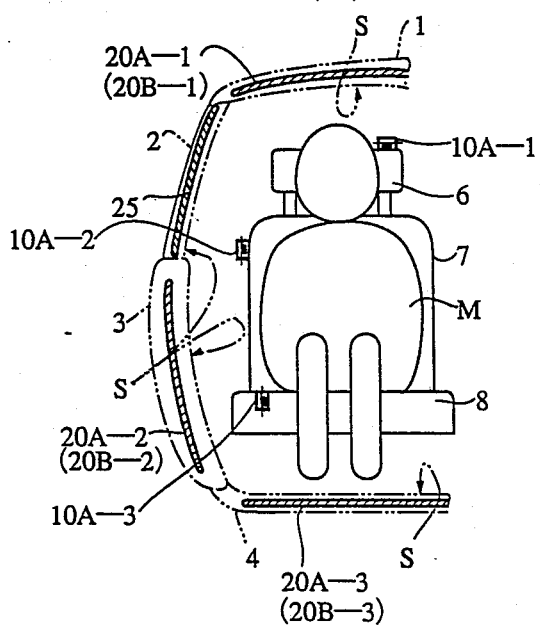

In FIG. 2(B), a vehicle passenger compartment is enclosed by vehicle body inner surface S such as a roof panel 1, side windshields 2, side door panels 3, a floor panel 4, etc. A passenger M takes a seat within the passenger compartment as shown. A number of radiant heat sensors (or thermometers) 10A are arranged within the passenger compartment. For instance, a first radiant heat sensor 10A-1 is mounted on a seat rest 6; a second radiant heat sensor 10A-2 is attached to a shoulder portion of a seat back 7; and a third radiant heat sensor 10A-3 is mounted on a front side of a seat cushion 8. These radiant heat sensors 10A are bolometers or thermopiles. Here, radiant heat is the energy transmitted by radiation as contrasted with that transmitted by conduction or convention.

The bolometer is a very sensitive resistance thermometer used in the detection and measurement of feeble thermal radiation and especially adapted to the study of infrared spectra. That is, the bolometer detects change in resistance of a thin conductive element, which is caused by heat effect of radiant heat energy. The thermopile is an apparatus consisting of a number of thermoelectric couples (as of antimony and bismuth or of copper sulfide and German silver) combined so as to multiply the effect and used to generate electric currents for various purposes and also in a very sensitive form for determining intensities of radiation due especially to its heating effect.

In the above description, without being limited to the radiant heat sensors, it is also possible to use the ordinary temperature sensors instead of the radiant heat sensors.

In addition, two temperature sensors 10B are provided for the vehicle. These sensors 10B are an internal temperature sensor 10B-1 disposed inside the passenger compartment and an external temperature sensor 10B-2 disposed outside the passenger compartment. These temperature sensors 10B can be used instead of (as described above) or in addition to the radiant heat sensors 10A.

Further, a number of temperature adjusters 20 are arranged in the vehicle body. A first heating element 20A-1 is disposed in the roof panel 1; a second heating element 20A-2 is disposed in each of the door panels 3; a third heating element 20A-3 is disposed in the floor panel 4. Similarly, a first cooling element 20B-1 is disposed in the roof panel 1; a second cooling elements 20B-2 is disposed in each of the door panels 3; a third cooling element 20B-3 is disposed in the floor panel 4. In addition, light transmissivity adjustable glass by which the amount of light passed therethrough can be controlled is used as each of the side windshields 25.

The heating elements 20A-1, 20A-2 and 20A-3 are heaters such as nichrome wire, ceramics heater, etc. The cooling elements 20B-1, 20B-2 and 20B-3 are heat exchangers connected to an air conditioner, for instance. Further, it is also possible to utilize Peltier elements for both the heating and cooling elements. In Peltier effect, heat is generated or absorbed according to the direction of current passed through a contact surface at which two different metals are joined.

Further, light transmissivity adjustable glass is such glass that the amount of light passed therethrough can be controlled reversively according to the strength of electric field applied thereto, or photochromic glass whose color (viz., light transmissivity) can be controlled reversively according to the intensity of light (e.g. ultraviolet rays) passed therethrough.

Figure 3:
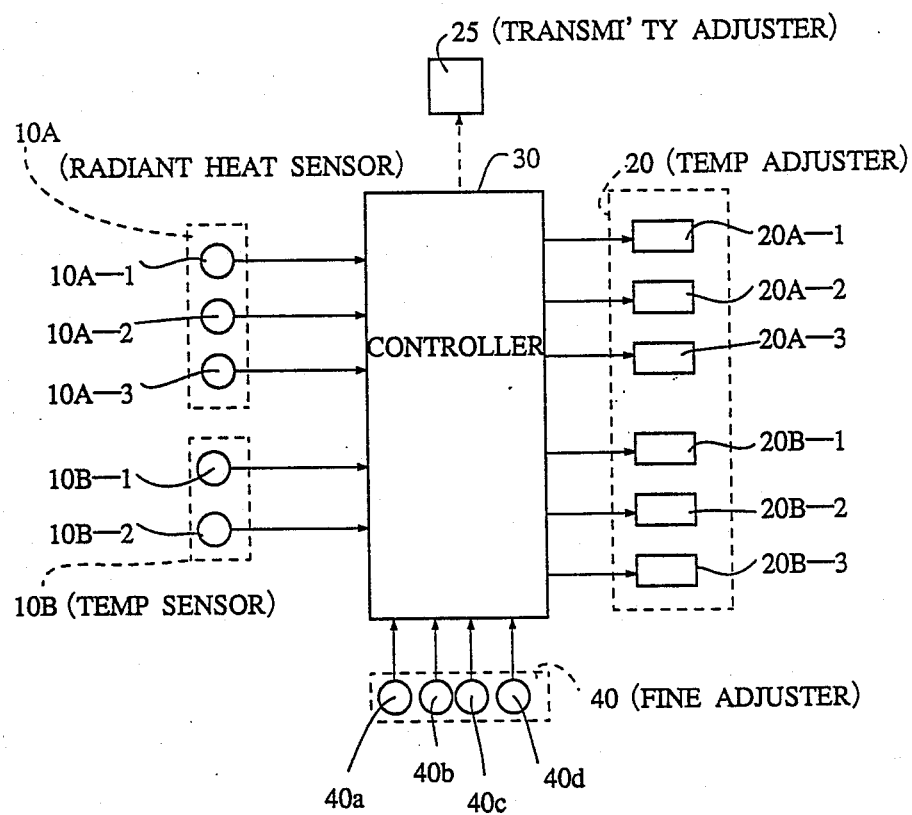
FIG. 3 is a schematic block diagram showing the radiant heat control apparatus according to the present invention.

As shown in FIG. 3, the radiant heat sensors 10A (10A-1, 10A-2, 10A-3) and the temperature sensors 10B (10B-1, 10B-2) are connected to a controller 30 for automatic air conditioning apparatus. The controller 30 is connected to the temperature adjusters 20 (20A-1, 20A-2, 20A-3) and (20B-1, 20B-2, 20B-3) and the light transmissivity adjustable glass 25, where necessary. Therefore, the controller 30 can independently activate the temperature adjusters 20 on the basis of various sensor signals of the radiant heat sensors 10A and the temperature sensors 10B in order to adjust each of the temperature on each of the compartment inner surfaces S enclosing the passenger M.

Figure 4:
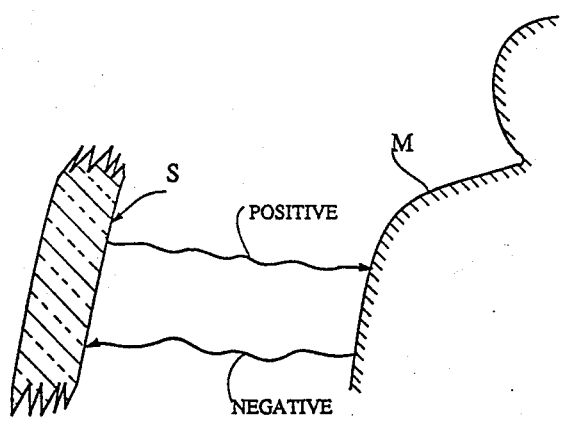
FIG. 4 is an enlarged illustration for assistance in explaining the amount of radiant heat transferred between the passenger and the side windshield glass.

The comfortable condition of the passenger will be described in relation to the amount of radiant heat transferred to or from the vehicle body inner surface with reference to FIGS. 4 and 5. In FIG. 4, when temperature on the vehicle body inner surface S is higher than that of the skin of a passenger M, a positive heat radiation P occurs from the vehicle body inner surface S to the passenger M. In contrast with this, when temperature on the vehicle body inner surface S is lower than that of the passenger M, a negative heat radiation N occurs from the passenger M to the vehicle body inner surface S.

Whenever the above-mentioned positive or negative heat radiation P or N occurs, even if temperature within the passenger compartment is kept at a predetermined constant temperature, the passenger M feels discomfort because radiant heat is radiated from or absorbed by the passenger M.

Figure 5:
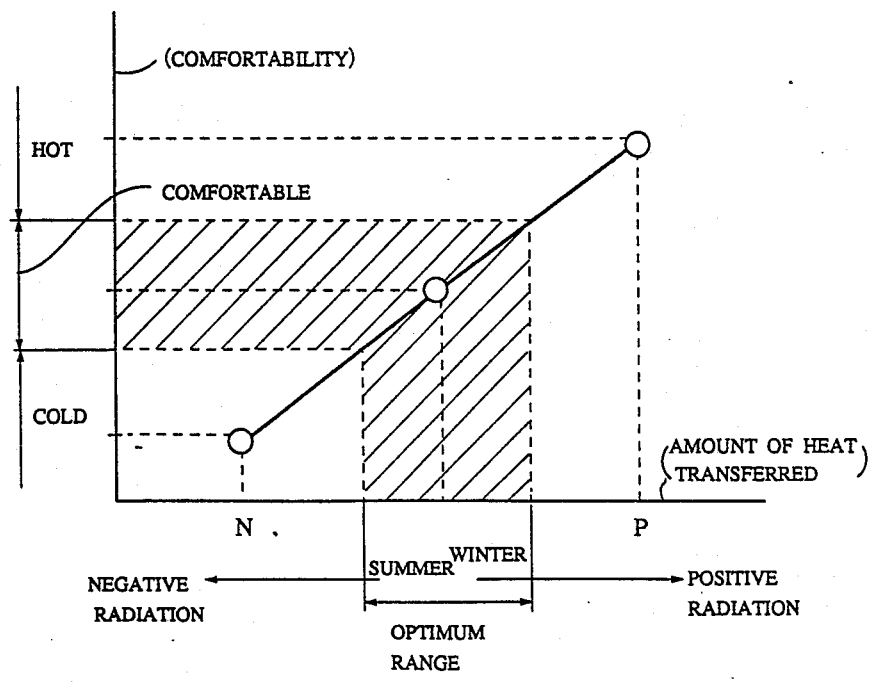
FIG. 5 is a graphical representation showing the relationship between the amount of radiant heat transferred between the two and a passenger's feeling or comfortability.

With reference to FIG. 5, an optimum range within which the passenger feels comfortable is such condition that no positive (P) and negative (N) heat radiation occurs; that is, the amount of radiant heat transferred between the vehicle body inner surface S and the passenger M is small. This optimum range corresponds to a temperature difference range of about ±2 degrees between the surface S and the passenger M when measured by a globe thermometer. The reason why the comfortable feeling has a range is that, the passenger feels comfortable in summer when negative heat radiation rather occurs and in winter when positive heat radiation rather occurs.

The operation of the control apparatus will be described hereinbelow.

In winter, since external temperature is low and therefore temperature on the vehicle body inner surface S drops, a negative heat radiation. N occurs between the passenger M and the vehicle body inner surface S. Under these conditions, the radiant heat sensors 10A (10A-1, 10A-2, 10A-3) detect low or zero radiant heat and the inner and outer temperature sensors 10B (10B-1, 10B-2) detect a difference in temperature between the inside and the outside of the passenger compartment. The controller 30 actuates the temperature adjusters (heating elements) 20 (20A-1, 20A-2, 20A-3) in response to signals of the sensors 10A and 10B.

Therefore, the temperature adjusters 20 are energized or the light transmissivity adjustable glass 25 is activated to introduce light into the passenger compartment, so that temperature within the passenger compartment rises to reduce the negative heat radiation between the vehicle body inner surface S and the passenger M. That is, the amount of radiant heat transferred between the two S and M can be maintained within the optimum range and thereby the passenger M feels comfortable.

In summer, since external temperature is high and therefore temperature on the vehicle body inner surface S rises, a positive heat radiation P occurs between the inner surface S and the passenger M. Under these conditions, the radiant heat sensors 10A detect high radiant heat and the inner and outer temperature sensors 10B detect a difference in temperature between the inside and the outside of the passenger compartment. The controller 30 actuates the temperature adjusters (cooling elements) 20 (20B-1, 20B-2, 20B-3) in response to signals of the sensors 10A and 10B. Therefore, the temperature adjusters 20 are energized or the light transmissivity adjustable glass 25 is activated to shut off light introduced into the passenger compartment, so that temperature within the passenger compartment drops to reduce the positive heat radiation between the vehicle body inner surface S and the passenger M. That is, the amount of heat transferred between the two S and M can be maintained within the optimum range and thereby the passenger M feels comfortable.

Figure 6:
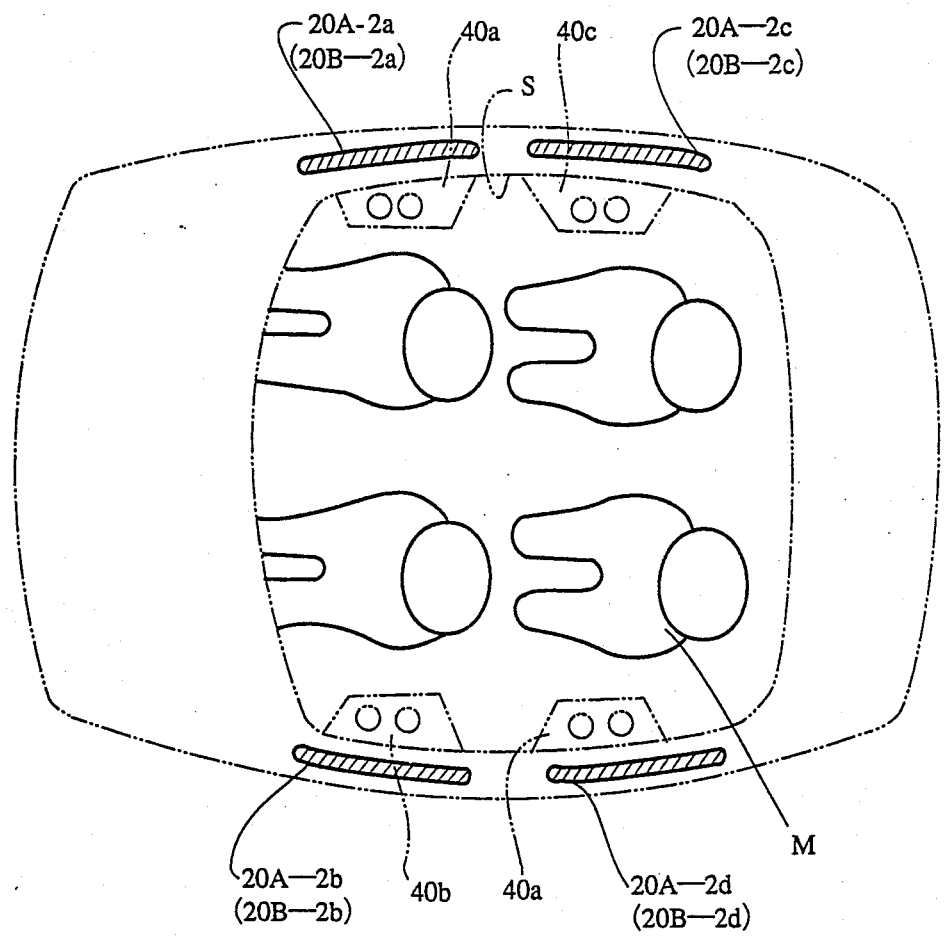
FIG. 6 is a diagrammatical top view for assistance in explaining the arrangement of another embodiment of the radiant heat control apparatus for an automotive vehicle according to the present invention.

FIG. 6 shows another embodiment of the control apparatus of the present invention. In this embodiment, four fine adjusters 40 are additionally provided for four passengers M. In more detail, a first fine adjuster 40a is mounted on a front righthand door to finely control the energization of the front righthand temperature adjuster 20A-2a or 20B-2a; a second fine adjuster 40b is mounted on a front lefthand door to finely control the energization of the front lefthand temperature adjuster 20A-2b or 20B-2b and so on. Further, it is also possible to allow each fine adjuster 40a, 40b, 40c or 40d to control all the temperature adjusters 20A-1, 10A 2, 20A-3 or 20B-1, 20B-2, 20B-3 simultaneously, so as to control the temperature of the vehicle body inner surfaces S according to passenger's preference.

As described above, in the radiant heat control apparatus according to the present invention, since radiant heat transferred between the vehicle body inner surface and the passenger is detected to control the temperature of the vehicle body inner surface, it is possible to control the amount of radiant heat transferred between the vehicle body and the passenger to an optimum range without being subjected to the influence of temperature difference between the inside and the outside of the passenger compartment.

Further, it is possible to control the environment within the passenger compartment at an optimum comfortable condition without depending upon complicated method of finely controlling the air conditioner, thus simplifying the configuration of an entire air conditioning system. Furthermore, each passenger can adjust the environment within the passenger compartment according to passenger's preference by using the fine adjusters 40.

What is claimed is:

1. A radiant heat control apparatus for an automotive vehicle with a vehicle body and a passenger compartment, comprising:
   (a) radiant heat sensing means, disposed within the passenger compartment, for sensing radiant heat transferred between an inner surface of the vehicle body and an inner position within the passenger compartment;
   (b) temperature adjusting means, disposed in the vehicle body, for adjusting temperature on the inner surface of the vehicle body;
   (c) control means, coupled to said radiant heat sensing means and said temperature adjusting means, for controlling the amount of radiant heat transferred between the inner surface of the vehicle body and the inner position within the passenger compartment on the basis of signals from said radiant heat sensing means.

2. The radiant heat control apparatus of claim 1, wherein said radiant heat sensing means comprises:
   (a) first radiant heat sensing means mounted on head rests;
   (b) second radiant heat sensing means mounted on shoulder portions of seat backs; and
   (c) third radiant heat sensing means mounted on front sides of seat cushions.

3. The radiant heat control apparatus of claim 1, wherein said radiant heat sensing means is a bolometer.

4. The radiant heat control apparatus of claim 1, wherein said radiant heat sensing means is a thermopile.

5. The radiant heat control apparatus of claim 1, wherein said radiant heat sensing means is a temperature sensor.

6. The radiant heat control apparatus of claim 1, wherein said radiant heat sensing means comprises:
   (a) an inner temperature sensor disposed within the passenger compartment; and
   (b) an outer temperature sensor disposed on an outer surface of the vehicle body.

7. The radiant heat control apparatus of claim 1, which further comprises:
   (a) an inner temperature sensor disposed within the passenger compartment; and
   (b) an outer temperature sensor disposed on an outer surface of the vehicle body, said inner and outer temperature sensors being connected to said control means to supply a signal indicative of temperature difference between inside and outside of the passenger compartment.

8. The radiant heat control apparatus of claim 1, wherein said temperature adjusting means comprises:
   (a) first temperature adjusting means disposed in a roof panel;
   (b) second temperature adjusting means disposed in door panels; and
   (c) third temperature adjusting means disposed in a floor panel.

9. The radiant heat control apparatus of claim 1, wherein said temperature adjusting means is a heating element.

10. The radiant heat control apparatus of claim 1, wherein said temperature adjusting means is a cooling element.

11. The radiant heat control apparatus of claim 1, wherein said temperature adjusting means is Peltier element.

12. The radiant heat control apparatus of claim 1, which further comprises light transmissivity adjustable means, disposed in side windshields, for controllably passing light therethrough.

13. The radiant heat control apparatus of claim 12, wherein said light transmissivity adjustable means is photochromic glass.

14. The radiant heat control apparatus of claim 1, which further comprises plural fine temperature adjusting means, coupled to said control means, for allowing passengers to finely adjust temperature on the inner surface of the vehicle body according to passenger's preference.

15. The radiant heat control apparatus of claim 1, wherein said control means activates said temperature adjusting means so that temperature difference between the inner surface of the vehicle body and the inner position within the passenger compartment may be reduced to a range less than two degrees.

16. The radiant heat control apparatus of claim 1, wherein said control means is used in common for an air conditioner provided for the automotive vehicle.

* * * * *